(12) United States Patent
Wang et al.

(10) Patent No.: US 11,980,912 B2
(45) Date of Patent: May 14, 2024

(54) MULTI-LAYER COATINGS AND METHODS OF PREPARING THE SAME

(71) Applicant: PPG Industries Ohio, Inc., Cleveland, OH (US)

(72) Inventors: Wei Wang, Allison Park, PA (US); David R. Fenn, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 608 days.

(21) Appl. No.: 17/251,292

(22) PCT Filed: Jun. 11, 2019

(86) PCT No.: PCT/US2019/036482
§ 371 (c)(1),
(2) Date: Dec. 11, 2020

(87) PCT Pub. No.: WO2019/241203
PCT Pub. Date: Dec. 19, 2019

(65) Prior Publication Data
US 2021/0129185 A1 May 6, 2021

Related U.S. Application Data

(60) Provisional application No. 62/683,302, filed on Jun. 11, 2018.

(51) Int. Cl.
| | |
|---|---|
| *B05D 7/00* | (2006.01) |
| *C08F 220/06* | (2006.01) |
| *C08F 220/14* | (2006.01) |
| *C08F 220/18* | (2006.01) |
| *C08F 220/20* | (2006.01) |
| *C08F 222/06* | (2006.01) |
| *C08F 222/10* | (2006.01) |
| *C08G 18/12* | (2006.01) |
| *C08G 18/28* | (2006.01) |
| *C08G 18/32* | (2006.01) |
| *C08G 18/34* | (2006.01) |
| *C08G 18/67* | (2006.01) |
| *C08G 18/75* | (2006.01) |
| *C08G 18/78* | (2006.01) |
| *C08K 5/00* | (2006.01) |

(52) U.S. Cl.
CPC ............ *B05D 7/572* (2013.01); *B05D 7/574* (2013.01); *B05D 7/576* (2013.01); *C08F 220/06* (2013.01); *C08F 220/14* (2013.01); *C08F 220/1804* (2020.02); *C08F 220/20* (2013.01); *C08F 222/06* (2013.01); *C08F 222/102* (2020.02); *C08G 18/12* (2013.01); *C08G 18/281* (2013.01); *C08G 18/3206* (2013.01); *C08G 18/341* (2013.01); *C08G 18/672* (2013.01); *C08G 18/755* (2013.01); *C08G 18/7843* (2013.01); *C08K 5/0041* (2013.01); *B05D 2202/10* (2013.01); *B05D 2350/60* (2013.01); *B05D 2425/01* (2013.01); *B05D 2425/02* (2013.01); *B05D 2425/03* (2013.01); *B05D 2502/00* (2013.01); *B05D 2503/00* (2013.01)

(58) Field of Classification Search
None
See application file for complete search history.

(56) References Cited

U.S. PATENT DOCUMENTS

| | | | |
|---|---|---|---|
| 4,933,056 A | 6/1990 | Corrigan et al. | |
| 5,530,043 A | 6/1996 | Zawacky et al. | |
| 5,760,107 A | 6/1998 | Valko et al. | |
| 5,820,987 A | 10/1998 | Kaufman et al. | |
| 7,288,595 B2 | 10/2007 | Swarup et al. | |
| 7,910,211 B2 | 3/2011 | Avgenaki et al. | |
| 8,313,835 B2 | 11/2012 | Avgenaki et al. | |
| 8,846,156 B2 | 9/2014 | Swarup et al. | |
| 9,636,703 B2 | 5/2017 | Iwata et al. | |
| 2001/0023273 A1* | 9/2001 | Moos | C09D 175/02 524/507 |
| 2006/0223953 A1 | 10/2006 | Drescher et al. | |
| 2009/0169763 A1 | 7/2009 | Tiegs et al. | |
| 2012/0034468 A1 | 2/2012 | Low et al. | |
| 2014/0295091 A1 | 10/2014 | Stoffel et al. | |
| 2015/0093512 A1 | 4/2015 | Brunner et al. | |
| 2015/0210883 A1 | 7/2015 | Swarup et al. | |
| 2015/0267077 A1 | 9/2015 | Janoski, Sr. et al. | |
| 2017/0136493 A1* | 5/2017 | Lamers | C08G 18/246 |
| 2019/0023938 A1* | 1/2019 | Kurashina | C09D 7/63 |

FOREIGN PATENT DOCUMENTS

| | | |
|---|---|---|
| CN | 102405111 A | 4/2012 |
| RU | 2254351 C2 | 6/2005 |

(Continued)

*Primary Examiner* — Jeffrey D Washville

(74) *Attorney, Agent, or Firm* — Krisanne Shideler

(57) ABSTRACT

A multi-layer coating system includes: (a) a first basecoat layer formed from a first coating composition including a free polyisocyanate and hydroxyl functional polymeric core-shell particles; (b) a second basecoat layer applied over at least a portion of the first basecoat layer, the second basecoat layer formed from a second coating composition including carboxylic acid functional polymeric core-shell particles; and (c) a topcoat layer applied over at least a portion of the second basecoat layer, the topcoat layer formed from a coating composition including least one free polyisocyanate having a weight average molecular weight of less than 600 g/mol and at least one film-forming resin in which an amount of free polyisocyanate having a weight average molecular weight of less than 600 g/mol is greater than 5 weight %, based on the total resin solids of the coating composition that forms the topcoat layer.

19 Claims, No Drawings

(56) References Cited

FOREIGN PATENT DOCUMENTS

| RU | 2617490 C2 | 4/2017 | |
|---|---|---|---|
| WO | 2008051346 A1 | 5/2008 | |
| WO | 2017030545 A1 | 2/2017 | |
| WO | 2017160398 A1 | 9/2017 | |
| WO | 2017162475 A1 | 9/2017 | |
| WO | WO-2017162425 A1 * | 9/2017 | ............ F02B 75/045 |
| WO | 2019241203 A1 | 12/2019 | |

* cited by examiner

MULTI-LAYER COATINGS AND METHODS OF PREPARING THE SAME

FIELD OF THE INVENTION

The present invention relates to multi-layer coatings that can be applied to substrates such as automotive substrates and methods of preparing and applying such coatings.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to automotive substrates including vehicles and motorcycles, can be formed from compositions that can be baked and formed at low cure temperatures. Because these compositions can be baked at low cure temperatures, they have been found useful in forming multi-layer coatings which often include a topcoat layer applied over the basecoat layer(s). It is accordingly an objective of the present invention to provide multi-layer coatings that can be dehydrated and cured at comparatively low temperatures to form coatings having various properties, thereby reducing costs and increasing efficiency of coating processes such as in the automotive industry for example.

SUMMARY OF THE INVENTION

The present invention relates to a multi-layer coating system that comprises: (a) a first basecoat layer formed from a first coating composition comprising a free polyisocyanate and hydroxyl functional polymeric core-shell particles in which a polymeric core and a polymeric shell of the hydroxyl functional core-shell particles each independently comprise an addition polymer derived from ethylenically unsaturated monomers; (b) a second basecoat layer applied over at least a portion of the first basecoat layer, the second basecoat layer formed from a second coating composition comprising carboxylic acid functional polymeric core-shell particles in which a polymeric core of the carboxylic acid functional core-shell particles comprises an addition polymer derived from ethylenically unsaturated monomers and a polymeric shell of the carboxylic acid functional core-shell particles comprises urethane linkages and carboxylic acid functional groups; and (c) a topcoat layer applied over at least a portion of the second basecoat layer, the topcoat layer formed from a coating composition comprising at least one free polyisocyanate having a weight average molecular weight of less than 600 g/mol and at least one film-forming resin reactive with the free polyisocyanate in which an amount of free polyisocyanate having a weight average molecular weight of less than 600 g/mol is greater than 5 weight %, based on the total resin solids of the coating composition that forms the topcoat layer.

The present invention also relates to a process of coating a substrate with a multi-layer coating comprising: (i) forming a first basecoat layer over at least a portion of a substrate by depositing a first coating composition onto at least a portion of the substrate, wherein the first basecoat layer is formed from a first coating composition comprising a free polyisocyanate and hydroxyl functional polymeric core-shell particles in which a polymeric core and a polymeric shell of the hydroxyl functional core-shell particles each independently comprise an addition polymer derived from ethylenically unsaturated monomers; (ii) forming a second basecoat layer over at least a portion of the first basecoat layer by depositing a second coating composition directly onto at least a portion of (1) the first basecoat layer after the first coating composition is dehydrated or (2) the first coating composition before the first coating composition is dehydrated in which the second basecoat layer is formed from a second coating composition comprising carboxylic acid functional polymeric core-shell particles in which a polymeric core of the carboxylic acid functional core-shell particles comprises an addition polymer derived from ethylenically unsaturated monomers and a polymeric shell of the carboxylic acid functional core-shell particles comprises urethane linkages and carboxylic acid functional groups; and (iii) forming a topcoat layer over at least a portion of the second basecoat layer, the topcoat layer formed from a coating composition comprising at least one free polyisocyanate having a weight average molecular weight of less than 600 g/mol and at least one film-forming resin reactive with the free polyisocyanate in which an amount of free polyisocyanate having a weight average molecular weight of less than 600 g/mol is greater than 5 weight %, based on the total resin solids of the coating composition that forms the topcoat layer. The first basecoat composition and second basecoat composition are dehydrated at a temperature within a range of from ambient temperature to 90° C. for two minutes or less.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" core-shell particle, "a" free polyisocyanate, and the like refer to one or more of any of these items.

The present invention is related to a multi-layer coating that comprises at least a first basecoat layer, a second basecoat layer, and a topcoat layer. A "basecoat" refers to a coating that is deposited onto a primer and/or directly onto a substrate, optionally including components (such as pigments) that impact the color and/or provide other visual impact. A "topcoat" refers to an uppermost coating that is deposited over another coating layer such as a basecoat to provide a protective and/or decorative layer.

The first basecoat layer can be formed from a coating composition that comprises a free polyisocyanate and hydroxyl functional polymeric core-shell particles in which a polymeric core and a polymeric shell of the hydroxyl functional core-shell particles each independently comprise an addition polymer derived from ethylenically unsaturated monomers As used herein, a "free polyisocyanate" refers to polyisocyanates in which at least some of the isocyanate functional groups (also referred to herein as "NCO groups") are not blocked. Non-limiting examples of free isocyanates include any of the following compounds in which the NCO groups are not blocked: isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

The free polyisocyanate can comprise at least 15 weight %, at least 20 weight %, or at least 25 weight %, based on the total resin solids weight of the coating composition that forms the first basecoat layer. The free polyisocyanate can also comprise up to 40 weight %, up to 35 weight %, or up to 30 weight %, based on the total resin solids weight of the coating composition that forms the first basecoat layer. The free polyisocyanate can further comprise an amount within a range such as for example from 15 weight % to 40 weight %, or from 20 weight % to 30 weight %, based on the total resin solids weight of the coating composition that forms the first basecoat layer.

As indicated, the coating composition that forms the first basecoat layer also comprises hydroxyl functional polymeric core-shell particles. As used herein, a core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s) (i.e., the core). The core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size can for example be determined with a Zetasize 3000HS following the instructions in the Zetasize 3000HS manual.

As indicated, the core-shell particles comprise a polymeric core as well as a polymeric shell. A "polymeric core" means that the core of the core-shell particle comprises one or more polymers and a "polymeric shell" means that the shell of the core-shell particle comprises one or more polymers. As used herein, a "polymer" refers to oligomers and homopolymers (e.g., prepared from a single monomer species), copolymers (e.g., prepared from at least two monomer species), and graft polymers. The term "resin" is used interchangeably with the term "polymer."

The polymeric shell and polymeric core of the hydroxyl functional core-shell particles comprise addition polymers derived from ethylenically unsaturated monomers. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. As used herein, the term "(meth)acrylate" refers to both the methacrylate and the acrylate.

Specific non-limiting examples of ethylenically unsaturated monomers that can be used to form the hydroxyl functional core-shell particles include, but are not limited to, alkyl esters of (meth)acrylic acid, hydroxyalkyl esters of (meth)acrylic acid, acid group containing ethylenically unsaturated monomers, vinyl aromatic monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth)acrylic acid include hydroxymethyl (meth)acrylate, hydroxyethyl (meth)acrylate, hydroxypropyl (meth)acrylate, hydroxybutyl (meth)acrylate, and combinations thereof.

Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethyl styrene, isopropylstyrene, butyl styrene, vinyl naphthalene, vinyl toluene, divinyl aromatic monomers, such as divinyl benzene, and combinations thereof.

The polymeric core and polymeric shell of the core-shell particles are also prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve in water or other aqueous based mediums. Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. As used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often free of water-dispersible groups.

Thus, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in an aqueous medium so that the polymeric shell at least partially encapsulates the hydrophobic core.

As previously described, the water-dispersible groups comprise one or more hydrophilic functional groups. For example, the polymer(s) that form the hydrophilic polymeric shell can comprise ionic or ionizable groups including the hydroxyl groups and optionally carboxylic acid functional groups or salts thereof. Carboxylic acid functional groups can be at least partially neutralized (i.e., at least 30% of the total neutralization equivalent) by a base, such as a volatile amine, to form a salt group. A volatile amine refers as an amine compound having an initial boiling point of less than or equal to 250° C. as measured at a standard atmospheric pressure of 101.3 kPa. Examples of suitable volatile amines are ammonia, dimethylamine, trimethylamine, monoethanolamine, and dimethylethanoamine. It is appreciated that the amines will evaporate during the formation of the coating to expose the carboxylic acid functional groups and allow the carboxylic acid functional groups to undergo further reactions. Other non-limiting, examples of water-dispersible groups include polyoxyalkylene groups such as by using polyethylene/propylene glycol ether materials for example.

It is appreciated that the hydroxyl functional core-shell particles are obtained from at least hydroxyl functional ethylenically unsaturated monomers and ethylenically unsaturated monomers that are free of water-dispersible groups. Further, the polymeric shell of the hydroxyl functional core-shell particles comprises the hydroxyl functional groups while the polymeric core can be free of hydroxyl functional groups.

Further, the hydroxyl functional polymeric core-shell particles of the first coating composition can be obtained from components that comprise greater than 10 weight % of a hydroxyl functional ethylenically unsaturated monomer, or greater than 25 weight % of a hydroxyl functional ethylenically unsaturated monomer, or greater than 35 weight % of a hydroxyl functional ethylenically unsaturated monomer, based on the total weight of the components that form the polymeric shell. The hydroxyl functional polymeric core-shell particles of the first coating composition can be obtained from components that comprise up to 45 weight % of a hydroxyl functional ethylenically unsaturated monomer, or up to 40 weight % of a hydroxyl functional ethylenically unsaturated monomer, based on the total weight of the components that form the polymeric shell. The hydroxyl functional polymeric core-shell particles of the first coating composition can be obtained from components that comprise an amount within a range such as from 20 weight % to 40 weight % of a hydroxyl functional ethylenically unsaturated monomer, based on the total weight of the components that form the polymeric shell.

The hydroxyl functional ethylenically unsaturated monomer used to form the hydroxyl functional polymeric core-shell particles of the first coating composition can also be used to form a separate homopolymer in order to evaluate the Van Krevelen solubility parameter of polymers formed with the monomer. For instance, the homopolymer formed from the hydroxyl functional ethylenically unsaturated monomer used to form the hydroxyl functional polymeric core-shell particles, such as to form the polymeric shell, of the first coating composition can have a Van Krevelen solubility parameter at 298K of greater than 25.0 $MPa^{0.5}$, or a solubility parameter at 298K of greater than 26.0 $MPa^{0.5}$. The van Krevelen solubility parameter for a homopolymer is calculated using Synthia implemented in Material Studio 5.0, available from Accelrys, Inc., San Diego, Calif.

The polymeric shell of the hydroxyl functional polymeric core-shell particles of the first coating composition can comprise at least 5 weight %, at least 10 weight %, or at least 15 weight % of each core-shell particle, based on the total solids weight of the core-shell particle. The polymeric shell of the hydroxyl functional polymeric core-shell particles of the first coating composition can comprise up to 30 weight %, up to 25 weight %, or up to 20 weight % of each core-shell particle, based on the total solids weight of the core-shell particle. The polymeric shell of the hydroxyl functional polymeric core-shell particles of the first coating composition can further comprise an amount within a range such as for example from 5 weight % to 30 weight %, or from 10 weight % to 20 weight %, of each core-shell particle, based on the total solids weight of the core-shell particle.

One or more, including all for example, of the hydroxyl functional polymeric core-shell particles of the first coating composition can comprise a weight ratio of the core to the shell of from 95:5 to 70:30, or from 90:10 to 75:25, or from 90:10 to 80:20, or from 85:15 to 80:20.

The hydroxyl functional core-shell particles can also comprise additional functional groups. Non-limiting examples of additional functional groups that can be formed on the polymeric shell and/or polymeric core include amine groups, epoxide groups, carboxylic acid groups, thiol groups, carbamate groups, amide groups, urea groups, isocyanate groups (including blocked isocyanate groups), aldo groups (aldehyde groups), keto groups (ketone groups), ethylenically unsaturated groups, and combinations thereof. It is appreciated that the polymeric shell, polymeric core, or both can be free of (i.e., does not contain) any of the previously described functional groups such as being free of aldo groups and keto groups for example.

The polymeric shell is also covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the ethylenically unsaturated groups of the monomers and/or prepolymers that are used to form the polymeric shell and polymeric core can be reacted with each other to form a chemical bond. As used herein, a "prepolymer" refers to a polymer precursor capable of further reactions or polymerization by one or more reactive groups to form a higher molecular mass or cross-linked state.

The hydroxyl functional polymeric core-shell particles of the first coating composition can comprise at least 20 weight %, at least 25 weight %, or at least 30 weight %, based on the total resin solids weight of the coating composition that forms the first basecoat layer. The hydroxyl functional polymeric core-shell particles of the first coating composition can also comprise up to 60 weight %, up to 50 weight %, or up to 40 weight %, based on the total resin solids weight of the coating composition that forms the first basecoat layer. The hydroxyl functional polymeric core-shell particles of the first coating composition can further comprise an amount within a range such as for example from 20 weight % to 60 weight %, or from 25 weight % to 50 weight %, or from 25 weight % to 40 weight %, or from 30 weight % to 40 weight %, based on the total resin solids weight of the coating composition that forms the first basecoat layer.

The coating composition that forms the first basecoat layer can also optionally comprise carboxylic acid functional polymeric core-shell particles that are different from the hydroxyl functional polymeric core-shell particles. The carboxylic acid functional polymeric core-shell particles comprise a polymeric core comprising an addition polymer derived from ethylenically unsaturated monomers and a polymeric shell comprising urethane linkages and carboxylic acid functional groups. The polymeric shell can also comprise additional linkages including, but not limited to, ester linkages, ether linkages, urea linkages, and combinations thereof.

As indicated, the polymeric shell comprises carboxylic acid functional groups. The polymeric shell and/or core can also comprise additional functional groups. Other non-limiting examples of functional groups that can be formed on the polymeric shell and/or polymeric core include amine groups, epoxide groups, hydroxyl groups, thiol groups, carbamate groups, amide groups, urea groups, isocyanate groups (including blocked isocyanate groups), aldo groups, keto groups, ethylenically unsaturated groups, and combinations thereof. It is appreciated that the polymeric shell, polymeric core, or both can be free of (i.e., does not contain) any of the previously described functional groups such as being free of aldo groups and keto groups for example.

The carboxylic acid functional polymeric core-shell particles are prepared with various components. For example, the carboxylic acid core-shell particles can be formed from isocyanate functional polyurethane prepolymers, polyamines, and ethylenically unsaturated monomers. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may, for example, react with an isocyanate group to form a urethane linkage. A primary or secondary amine group may react with an isocyanate group to form a urea linkage. Examples of suitable compounds that can be used to form the polyurethane include, but are not limited to, polyols, polyisocyanates, compounds containing carboxylic acids such as diols containing carboxylic acids, polyamines, hydroxyl functional ethylenically unsaturated components such as hydroxyalkyl esters of (meth)acrylic acid, and/or other compounds having reactive functional groups, such as hydroxyl groups, thiol groups, amine groups, and carboxylic acids.

Non-limiting examples of suitable polyisocyanates and hydroxyl functional ethylenically unsaturated components include any of the compounds previously described.

Non-limiting examples of polyols include glycols, polyether polyols, polyester polyols, copolymers thereof, and combinations thereof. Non-limiting examples of low molecular weight glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols include polytetrahydrofuran, polyethylene glycol, polypropylene glycol, polybutylene glycol, and combinations thereof.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexantriol, glycerol, and combinations thereof.

Non-limiting examples of acid containing diols include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Suitable polyamines include aliphatic and aromatic compounds, which comprise two or more amine groups selected from primary and secondary amine groups. Examples include, but are not limited to, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof.

The carboxylic acid functional core-shell particles can have various shapes (or morphologies) and sizes such as the shapes and sizes previously described and are prepared to provide a hydrophilic polymeric shell with enhanced water-dispersibility/stability and a hydrophobic polymeric core so that the polymeric shell at least partially encapsulates the hydrophobic core. Further, the carboxylic acid functional groups can be at least partially neutralized (i.e., at least 30% of the total neutralization equivalent) by an inorganic base, such as a volatile amine, to form a salt group as previously described. The polymeric shell is also covalently bonded to at least a portion of the polymeric core such as by reacting ethylenically unsaturated groups from the polymeric shell and the polymeric core.

The coating composition that forms the first basecoat layer can further comprise additional materials including, but not limited to, additional resins such as additional film-forming resins. As used herein, a "film-forming resin" refers to a resin that when used in a coating composition can form a self-supporting continuous film on at least a horizontal surface through dehydration and/or upon curing. The term "dehydration" refers to the removal of water and/or other solvents. It is appreciated that dehydration can also cause at least partial curing of a resinous material. The coating composition comprising the additional resin can be dehydrated and/or cured at ambient conditions, with heat, or with other means such as actinic radiation as previously described. Further, "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35% to 75%).

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Non-limiting examples of suitable additional resins include polyurethanes, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include particulate and non-particulate resins.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. Alternatively, a thermosetting film-forming resin can be used having functional groups that are reactive with themselves; in this manner, such thermosetting resins are self-crosslinking.

The coating composition that forms the first basecoat layer can further include one or more additional crosslinkers other than the free polyisocyanate. As used herein, a "crosslinking agent", "crosslinker", and like terms refers to a molecule comprising two or more functional groups that are reactive with other functional groups and which is capable of linking two or more monomers or polymer molecules through chemical bonds. Non-limiting examples of additional crosslinkers include polyhydrazides, carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts, aziridines, and combinations thereof. For example, the coating composition that forms the first coating layer can further comprise an aminoplast resin such as a melamine-formaldehyde resin. The coating compositions of the present invention can also be free of any one or all of the additional film-forming resins and/or crosslinkers such as being free of polyhydrazides for example.

The coating composition that forms the first basecoat layer can also include other additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating composition by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

The colorant which can be used with the coating composition that forms the first basecoat layer can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of further materials that can optionally be used with the coating composition that forms the first basecoat layer include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

It is appreciated that the components of the first coating composition described herein are dispersed in an aqueous medium. As used herein, an "aqueous medium" refers to a liquid medium comprising greater than 50 weight % water, based on the total weight of the liquid medium. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

The first coating composition can be applied directly or indirectly over at least a portion of the substrate by any means standard in the art, such as spraying, electrostatic spraying, dipping, rolling, brushing, and the like.

The first coating composition can be applied to a wide range of substrates known in the coatings industry. For example, the coating composition can be applied to automotive substrates, industrial substrates, aircrafts and aircraft substrates and components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather, both synthetic and natural, and the like. The substrate can be one that has been already treated in some manner, such as to impart visual and/or color effect, a protective pretreatment or other coating layer, and the like.

The coatings of the present invention are particularly beneficial when applied to a metallic substrate. For example, the coatings of the present invention are particularly beneficial when applied to metallic substrates that are used to fabricate automotive vehicles, such as cars, trucks, and tractors.

After applying the first coating composition, the second coating composition can then be applied directly over at least a portion of the first coating composition as a wet-on-wet process, (i.e. prior to dehydration of the first coating composition), or the second coating composition can be applied after the first coating composition is dehydrated. The second coating composition can be applied by any means standard in the art, such as spraying, electrostatic spraying, dipping, rolling, brushing, and the like.

The second coating composition that forms the second basecoat layer comprises the previously described carboxylic acid functional polymeric core-shell particles. It is appreciated that the carboxylic acid functional polymeric core-shell particles are obtained from the materials previously described and include any of the characteristics previously described with respect to the carboxylic acid functional polymeric core-shell particles.

The carboxylic acid functional polymeric core-shell particles of the second coating composition can comprise greater than 20 weight %, greater than 25 weight %, or greater than 30 weight %, based on the total resin solids weight of the coating composition that forms the second basecoat layer. The carboxylic acid functional polymeric core-shell particles of the second coating composition can also comprise up to 60 weight %, up to 50 weight %, or up to 45 weight %, based on the total resin solids weight of the coating composition that forms the second basecoat layer. The carboxylic acid functional polymeric core-shell particles of the second coating composition can further comprise an amount within a range such as for example from 20 weight % to 60 weight %, or from 25 weight % to 50 weight %, or from 30 weight % to 45 weight %, based on the total resin solids weight of the coating composition that forms the second basecoat layer.

The second coating composition can further include additional components. For example, the second coating composition can further comprise hydroxyl functional core-shell particles. The hydroxyl functional polymeric core-shell particles are obtained from the materials previously described and include any of the characteristics previously described with respect to the hydroxyl functional polymeric core-shell particles of the first coating composition. The second coating composition can also comprise any of the previously described additional resins, crosslinkers, colorants, and/or other optional materials. For instance, the second coating composition can further comprise a free polyisocyanate and/or an aminoplast such as a melamine-formaldehyde resin. Alternatively, the second coating composition can be free of any one or all of the previously described additional components such as being free of free polyisocyanate or free of an aminoplast such as a melamine-formaldehyde resin or free of polyhydrazides. It is appreciated that the components of the second coating composition described herein are dispersed in an aqueous medium.

The second coating composition can also comprise components that form a one-component composition. A one-component composition is also referred to as a one-package system or a 1K. As used herein, a "one-component composition" refers to a composition wherein all the coating components are maintained in the same container after manufacture, during storage, etc. In contrast, a multi-component composition, such as a two component composition ("2K") or more, has at least two components that are maintained in a different container after manufacture, during storage, etc. prior to application and formation of the coating over a substrate. Thus, the second coating composition can be free of components that are typically used to form a multi-component composition, such as being free of free polyisocyanates for example. It is appreciated that the first coating composition contains free polyisocyanates and is a multi-component composition, such as a two component composition ("2K").

A one-component composition is typically cured at elevated temperatures, such as for 1 to 30 minutes at about 250° F. to about 450° F. (121° C. to 232° C.). However, it was found that the second coating composition can be a one-component composition but which is cured at lower temperatures due to the compositional make-up of the first coating layer and the topcoat layer.

As previously described, the first coating composition can be applied directly or indirectly over at least a portion of the substrate, followed by the second coating composition that is directly applied before or after dehydrating the first coating composition. When the second coating composition is applied before the first coating composition is dehydrated, the first and second coating compositions can be dehydrated simultaneously at ambient temperatures (e.g. 20° C.) to 90° C., or from ambient temperatures to 80° C., or from ambient temperatures to 70° C., or from ambient temperatures to 60° C., or from 40° C. to 80° C., or from 40° C. to 70° C. The coating compositions can be dehydrated at the above temperatures for a period of time of less than 2 minutes, or less than 1 minute. The period of time for dehydrating the coating composition is the designated period of time for dehydration and does not include the time it takes to transfer and subject the coating composition to another step such as a curing step.

The second basecoat composition can also be applied directly over at least a portion of the first basecoat layer that has been dehydrated as previously described. The second basecoat composition can then be dehydrated at ambient temperatures (e.g. 20° C.) to 90° C., or from ambient temperatures to 80° C., or from ambient temperatures to 70° C., or from ambient temperatures to 60° C., or from 40° C. to 80° C., or from 40° C. to 70° C. The coating compositions can be dehydrated at the above temperatures for a period of time of less than 2 minutes, or less than 1 minute.

The first and second basecoats taken together after dehydration can have a high solids content. For instance, the first and second basecoats taken together after dehydration can comprise a solids content of at least 80 weight %, based on the total weight of the first and second basecoats.

After dehydrating the second coating composition, the basecoats can be cured at temperatures of less than 120° C., or less than 100° C., or less than 80° C. The terms "curable", "cure", and the like, mean that at least a portion of the resinous materials in a composition is crosslinked or crosslinkable. Cure, or the degree of cure, can be determined by dynamic mechanical thermal analysis (DMTA) using a Polymer Laboratories MK III DMTA analyzer conducted under nitrogen. The degree of cure can for example be at least 10%, such as at least 30%, such as at least 50%, such as at least 70%, or at least 90% of complete crosslinking as determined by the analysis mentioned above.

It was found that the coatings of the present invention can be formed at lower dehydration/cure temperatures than those typically required in other coatings commonly applied to automotive substrates. As such, the coatings of the present invention help reduce costs and speed up the overall coating process.

The multi-layer coating also comprises a topcoat layer that is directly applied over at least a portion of the second basecoat layer before or after curing the basecoat layers. The topcoat layer is formed from a coating composition that comprises a film-forming resin and a free polyisocyanate reactive with the film-forming resin. It is appreciated that the first coating composition contains free polyisocyanates and is a multi-component composition, such as a two component composition ("2K").

The film-forming resin, for example, can include any of the film-resins previously described. For instance, the film-forming resin can comprise a polyol based film-forming resin. Non-limiting examples of film-forming resins can also include the film-forming resins available in the commercially available product from PPG Industries, Inc. under the tradenames CERAMICLEAR®.

It is appreciated that one or more, such as at least two different, free polyisocyanates can be used in the coating composition that forms the topcoat layer. In accordance with the present invention, at least one of the free polyisocyanates that form the coating composition of the topcoat layer have a weight average molecular weight of less than 600 g/mol. An amount of free polyisocyanate having a weight average molecular weight of less than 600 g/mol in the coating composition that forms the topcoat layer is greater than 5 weight %, or greater than 5.5 weight %, or greater than 6 weight %, or greater than 6.5 weight %, or at least 7 weight %, based on the total resin solids of the coating composition that forms the topcoat layer.

The weight average molecular weight is determined by gel permeation chromatography relative to linear polystyrene standards of 800 to 900,000 Da using a Waters 2695 separation module with a Waters 2414 differential refractometer (RI detector). Tetrahydrofuran (THF) is used as the eluent at a flow rate of 1 ml min−1, and two PLgel Mixed-C (300×7.5 mm) columns are used for separation at room temperature.

The free polyisocyanate(s) used in the composition that forms the topcoat layer can also comprise greater than 30 weight %, or greater than 35 weight %, of a uretdione dimer, based on the total resin solids weight of all the free polyisocyanate in the coating composition that forms the topcoat layer. The free polyisocyanate(s) used in the composition that forms the topcoat layer can also comprise up to 50 weight %, or up to 45 weight %, or up to 40 weight %, of a uretdione dimer, based on the total resin solids weight of all the free polyisocyanate in the coating composition that forms the topcoat layer. The free polyisocyanate(s) used in the composition that forms the topcoat layer can also comprise an amount within a range of from 30 weight % to 50 weight %, or from 35 weight % to 45 weight %, of a uretdione dimer, based on the total resin solids weight of all the free polyisocyanate in the coating composition that forms the topcoat layer.

The amount of uretdione dimer is determined by the gel permeation chromatography previously described.

It was found that the previously described amounts of free polyisocyanates having a weight average molecular weight of less than 600 g/mol and the amounts of uretdione dimer based polyisocyanate used to form the topcoat layer can provide improved properties to the topcoat layer and multilayer coating. For example, the topcoat layer comprising the previously described polyisocyanates was found to provide improved humidity resistance.

The topcoat layer used with the multi-layer coating of the present invention can be a clear topcoat layer. As used herein, a "clear coat layer" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clear topcoat layer can comprise colorants, such as pigments, provided that the colorants do not interfere with the desired transparency of the clear topcoat layer. Alternatively, the clear topcoat layer is free of colorants such as pigments (i.e., unpigmented).

As indicated, the topcoat layer can be cured simultaneously with the first and second basecoat layers. For instance, the topcoat layer and basecoat layers can be simultaneously cured at temperatures of less than 120° C., or less than 100° C., or less than 80° C.

The multi-layer coating according to the present invention can also comprise other optional layers including, but not limited to, additional basecoat layers as well as a primer coating layer as indicated above. As used herein, a "primer coating layer" refers to an undercoating that may be deposited onto a substrate in order to prepare the surface for application of a protective or decorative coating system. The primer coating layer can be formed over at least a portion of the substrate and the first or second basecoat layer can be formed over at least a portion of the primer coating layer. Further, the additional basecoat layers can be prepared from any of the core-shell particles and other materials previously described. The additional basecoat layers can be applied, for example, over the first or second basecoat layer before applying the topcoat layer.

The primer coating layer optionally used with the multi-layer coating of the present invention can be formed from a coating composition that comprises a film-forming resin such as a cationic based resin, an anionic based resin, and/or any of the additional film-forming resins previously described. The coating composition used to form the primer coating composition can also include the previously described crosslinkers, colorants, and other optional materials.

Additionally, the primer coating composition can include a corrosion inhibitor. As used herein, a "corrosion inhibitor" refers to a component such as a material, substance, compound, or complex that reduces the rate or severity of corrosion of a surface on a metal or metal alloy substrate. The corrosion inhibitor can include, but is not limited to, an alkali metal component, an alkaline earth metal component, a transition metal component, or combinations thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

As indicated, the primer coating composition can be deposited directly over at least a portion of a substrate before application of the first or second basecoat composition and dehydrated and/or cured to form the primer coating layer. The primer coating composition of the present invention can be applied by any means standard in the art, such as electrocoating, spraying, electrostatic spraying, dipping, rolling, brushing, and the like. Once the primer coating composition is applied to at least a portion of the substrate, the composition can be dehydrated and/or cured to form the primer coating layer. The primer coating composition can be dehydrated and/or cured, for example, at a temperature of 175° C. to 205° C. to form the primer coating layer.

It was found that the multi-layer coatings of the present invention can be formed at lower dehydration/cure temperatures than those typically required in other coatings commonly applied to automotive substrates. As such, the multi-layer coatings of the present invention help reduce costs, eliminate the amount of coating equipment, and speed up the overall coating process.

The present invention is also directed to a process of preparing a multi-layer coating. The process includes: forming a first basecoat layer over at least a portion of a substrate by depositing a first coating composition onto at least a portion of the substrate; and forming a second basecoat layer over at least a portion of the first basecoat layer by depositing a second coating composition directly onto at least a portion of: (1) the first basecoat layer after the first coating composition is dehydrated; or (2) the first coating composition before the first basecoat composition is dehydrated. The first and second basecoat compositions can be dehydrated separately or simultaneously and then cured as previously described. A topcoat layer is formed over at least a portion of the second basecoat layer by depositing a topcoat composition directly onto at least a portion of the second basecoat layer. The basecoat layers and topcoat layer can be cured simultaneously or separately.

The substrate can optionally comprise a primer coating layer and the first basecoat layer is applied over at least a portion of the primer coating layer by depositing a first basecoat composition directly onto at least a portion of the primer coating layer. The primer coating layer can be formed by depositing a primer coating composition, such as by electrodepositing an electrodepositable coating composition, onto at least a portion of the substrate prior to depositing the first basecoat composition.

The multi-coatings can be applied to any kind of substrate as described above, such as for example to automotive parts in an automotive assembly plant. In some examples, during application of the multi-layer coating in an automotive assembly plant, a metal substrate is, optionally, first passed to an electrodeposition station where the primer coating composition is electrodeposited over the metal substrate and dehydrated and/or cured. The first basecoat composition is then directly applied over the electrodeposited coating layer or, alternatively, directly applied over at least a portion of the substrate in a basecoat zone comprising one or more coating stations. The basecoat zone can be located downstream of and adjacent to an electrodeposition oven. The first basecoat station has one or more conventional applicators, e.g., bell or gun applicators, connected to or in flow communication with a source of the first basecoat composition. The first basecoat composition can be applied, e.g., sprayed, over the substrate by one or more applicators at the first basecoat station in one or more spray passes to form a first basecoat layer over the substrate.

The first basecoat can be dehydrated with a conventional drying device, such as an oven, located downstream of and/or adjacent to the second coating station and/or the first coating station. After applying the second basecoat composition, the second basecoat layer can be dehydrated separately if the first basecoat layer has been previously dehydrated. Alternatively, when the second basecoat composition is applied wet-on-wet to the first basecoat composition, both basecoat compositions can be simultaneously dehydrated. The basecoats can then be cured using an oven.

After the first basecoat composition and second basecoat composition have been dehydrated and/or cured, the topcoat layer is applied over the basecoat layer(s) at a topcoat station. The topcoat station includes one or more conventional applicators, e.g., bell applicators, connected to and in flow communication with a source of the topcoat composition. An oven is located downstream of and/or adjacent to the topcoat station to dehydrate and/or cure the topcoat composition separately or simultaneously with the basecoats.

A non-limiting example of an automotive assembly plant for applying a multi-layer coating is described in U.S. Pat. No. 8,846,156 at col. 3 line 1 to col. 4 line 43 and FIG. 1, which is incorporated by reference herein.

The following examples are presented to demonstrate the general principles of the invention. The invention should not be considered as limited to the specific examples presented. All parts and percentages in the examples are by weight unless otherwise indicated.

Example 1

Preparation of a Basecoat Composition

A grey basecoat composition according to the present invention was prepared from the components listed in Table 1.

TABLE 1

| Components | Parts by weight of Component |
| --- | --- |
| Polyurethane-acrylic dispersion[1] | 102.87 |
| acrylic latex A[2] | 128.41 |
| Byk 348 [3] | 0.26 |
| Byk 032 [4] | 1.60 |
| Surfynol ® 104E[5] | 3.47 |
| 50% DMEA[6] | 1.59 |
| Mineral Spirits[7] | 2.60 |
| White Tint[8] | 27.63 |
| Black Tint[9] | 17.63 |
| Yellow Tint[10] | 7.86 |
| Urethane Diol[11] | 5.22 |
| Dowanol PnB[12] | 2.60 |
| 2-ethylhexanol | 6.08 |
| 50% DMEA[6] | 1.13 |
| Byketol ® WS[13] | 6.73 |
| Resimene ® HM2608[14] | 7.02 |
| Cymel ® 1158[15] | 4.27 |
| Deionized Water | 27.21 |

[1] Polyurethane-acrylic dispersion made of 9.73 wt % adipic acid, 11.30 wt % isophthalic acid, 2.15 wt % maleic anhydride, 21.66 wt % 1,6-hexanediol, 5.95 wt % dimethylolpropionic acid, 1.0 wt % butanediol, 16.07 wt % isophorone diisocyanate, 26.65 wt % butyl acrylate, 2.74 wt % hydroxypropyl methacrylate and 2.74 wt % ethylene glycol dimethacrylate, with a solids content of 45 wt % in deionized water.

[2] Acrylic latex A is a polymeric core-shell type latex in which: the core is made of 65.1 wt % methyl methacrylate, 27.1 wt % butyl acrylate, 5.3 wt % hydroxyethyl methacrylate, 2.4 wt % ethylene glycol dimethacrylate, 0.1 wt % methacrylate acid; and the shell is made of 36.4 wt % butyl acrylate, 22.7 wt % methacrylate acid, 16.7 wt % methyl methacrylate and 24.2 wt % hydroxyethyl acrylate, the shell/core weight ratio is 87/13. The polymeric core-shell latex has a solids content of 25 wt % in deionized water.

[3] Silicone surfactant, commercially available from Byk Chemie.

[4] Defoamer, commercially available from Byk Chemie.

[5] Surfactant, commercially available from Air Products and Chemicals, Inc.

[6] Dimethyl ethanolamine 50% aqueous solution

[7] Solvent, commercially available from Shell Chemical Co.

[8] White tint paste formed from 61% TiO2 dispersed in 9% acrylic polymer blend having a solids content of 70 wt %.

[9] Black Tint paste formed from 6% carbon black dispersed in 18% acrylic polymer and having a solids content of 24 wt %.

[10] Yellow Tint paste formed from 25% Mapico Yellow 1050A dispersed in 21% acrylic polymer and having a solids content of 46 wt %.

[11] Polyurethane diol prepared by reacting 1 mole of Jeffamine D-400 (from Huntsman Chemical Co.) with 2 moles of ethylene carbonate at 130° C. as described in Example A of U.S. Pat. No. 7,288,595.

[12] Propylene glycol n-butyl ether, commercially available from Dow Chemical Co.

[13] Silicone-free surface additive, commercially available from Cytec.

[14] Melamine formaldehyde resin, available from ineos.

[15] Butylated melamine-formaldehyde cross-linking agent, available from Allnex.

The components listed in Table 1 were added slowly into a stirring/mixing vessel during mixing. The final coating composition had a pH of 9.1, a coatings solids content of 32 weight % and a viscosity of 90 cp as measured by BYK CAP 2000+ Viscometer with Spindle #4 at a shear rate of 1000 s$^{-1}$ and 20° C.

Example 2

Preparation of a Basecoat Composition

A grey basecoat composition according to the present invention was prepared from the components listed in Table 2.

TABLE 2

| Components | Parts by weight of Component |
| --- | --- |
| Polyurethane-acrylic dispersion[1] | 102.87 |
| acrylic latex A[2] | 37.47 |
| Byk 348[3] | 0.26 |
| Byk 032[4] | 1.60 |
| Surfynol ® 104E[5] | 3.47 |
| 50% DMEA[6] | 1.59 |
| Mineral Spirits[7] | 2.60 |
| White Tint[8] | 27.63 |
| Black Tint[9] | 17.63 |
| Yellow Tint[10] | 7.86 |
| Urethane Diol[11] | 5.22 |
| Dowanol PnB[12] | 2.60 |
| 2-ethylhexanol | 6.08 |
| 50% DMEA[6] | 1.13 |
| Byketol ® WS[13] | 6.73 |
| Resimene ® HM2608[14] | 7.02 |
| Cymel ® 1158[15] | 4.27 |
| Deionized Water | 27.21 |

The components listed in Table 2 were added slowly into a stirring/mixing vessel during mixing. The final coating composition had a pH of 9.1, a coatings solids content of 32 weight % and a viscosity of 90 cp as measured by BYK CAP 2000+ Viscometer with Spindle #4 at a shear rate of 1000 s$^{-1}$ and 20° C.

Example 3

Preparation of a Basecoat Composition

A grey basecoat composition according to the present invention was prepared from the components listed in Table 3.

TABLE 3

| Components | Parts by weight of Component |
| --- | --- |
| Polyurethane-acrylic dispersion[1] | 102.87 |
| acrylic latex B[16] | 37.47 |
| Byk 348[3] | 0.26 |
| Byk 032[4] | 1.60 |
| Surfynol ® 104E[5] | 3.47 |
| 50% DMEA[6] | 1.59 |
| Mineral Spirits[7] | 2.60 |
| White Tint[8] | 27.63 |
| Black Tint[9] | 17.63 |
| Yellow Tint[10] | 7.86 |
| Urethane Diol[11] | 5.22 |

TABLE 3-continued

| Components | Parts by weight of Component |
|---|---|
| Dowanol PnB[12] | 2.60 |
| 2-ethylhexanol | 6.08 |
| 50% DMEA[6] | 1.13 |
| Byketol ® WS[13] | 6.73 |
| Resimene ® HM2608[14] | 7.02 |
| Cymel ® 1158[15] | 4.27 |
| Deionized Water | 27.21 |

[16]Acrylic latex B is a polymeric core-shell type latex in which: the core is made of 65.8 wt % methyl methacrylate, 26.5 wt % butyl acrylate, 2.4 wt % hydroxyethyl methacrylate, 2.4 wt % ethylene glycol dimethacrylate, 2.9 wt % acrylamide; and the shell is made of 36.4 wt % butyl acrylate, 22.7 wt % methacrylate acid, 16.7 wt % methyl methacrylate and 24.2 wt % hydroxyethyl methacrylate. The shell:core weight ratio is 87:13 and the polymeric core-shell type latex has a solids content of 25 wt % in deionized water.

The components listed in Table 3 were added slowly into a stirring/mixing vessel during mixing. The final coatings composition had a pH of 9.1, a coatings solids content of 32 weight % and a viscosity of 90 cp as measured by BYK CAP 2000+ Viscometer with Spindle #4 at a shear rate of 1000 s$^{-1}$ and 20° C.

Example 4

Preparation of a Basecoat Composition

A silver basecoat composition according to the present invention was prepared from the components listed in Table 4.

TABLE 4

| Components | Parts by weight of Component |
|---|---|
| Polyurethane-acrylic dispersion[17] | 127.0 |
| acrylic latex A[2] | 158.0 |
| Byk 348[3] | 0.23 |
| Byk 032[4] | 1.96 |
| Surfynol ® 104E[5] | 5.04 |
| 50% DMEA[6] | 2.50 |
| Butylglykol[18] | 5.20 |
| Silver ultra ® 6704[19] | 9.55 |
| TCR3070A aluminum paste[20] | 12.94 |
| Aluminum passive solution[21] | 8.44 |
| Acematt ® TS100[22] | 1.06 |
| Dowanol PnB[12] | 3.0 |
| 2-ethylhexanol | 14.0 |
| 50% DMEA[6] | 1.13 |
| Resimene ® HM2608[14] | 11.1 |
| Deionized Water | 100.21 |

[17]Polyurethane-acrylic dispersion made of 7.7 wt % polytetramethylene ether glycol 1000, 1.5 wt % dimethylolpropionic acid, 5.1 wt % isophorone diisocyanate, 39.38 wt % butyl acrylate, 2.9 wt % hydroxypropyl methacrylate and 43.42 wt % ethylene glycol dimethacrylate, with a solids content of 38 wt % in deionized water.
[18]Ethylene glycol monobutyl ether, commercially available from BASF.
[19]Silver dollar aluminum pigment, commercially available from Siberline Manufacturing Co. Ltc.
[20]Aluminum Paste, commercially available from Toyal America.
[21]Aluminum passivator.
[22]Untreated thermal silica, available from Evonik Degussa.

The components listed in Table 4 were added slowly into a stirring/mixing vessel during mixing. The final coating composition had a pH of 9.1, a coatings solids content of 31 weight % and a viscosity of 70 cp as measured by BYK CAP 2000+ Viscometer with Spindle #4 at a shear rate of 1000 s$^{-1}$ and 20° C.

Examples 5-13

Preparation of Topcoat Compositions

Several topcoat compositions were prepared for the multi-layer coatings. The topcoat compositions were a two component polyol-polyisocyanate crosslinkable compositions based on 2K CERAMICLEAR® repair clearcoat (Commercially available from PPG Industries, Inc.). The polyisocyanate mixture component was prepared with the components in Table 5.

TABLE 5

| Example | Desmodur N-3300A[23] (grams) | Desmodur N-3400[24] (grams) | n-amyl acetate (grams) | n-butyl acetate (grams) | Aromatic 100[25] (grams) | 10% dibutyl tin dilaurate in Xylene (grams) | Weight % of free NCO with Mw of less than 600 g/mol[26] |
|---|---|---|---|---|---|---|---|
| 5 | 39.48 | 0 | 8 | 6 | 4 | 0.5 | 0.43 |
| 6 | 35.53 | 3.95 | 8 | 6 | 4 | 0.5 | 3.73 |
| 7 | 31.58 | 7.90 | 8 | 6 | 4 | 0.5 | 6.85 |
| 8 | 27.64 | 11.84 | 8 | 6 | 4 | 0.5 | 9.9 |
| 9 | 23.69 | 15.79 | 8 | 6 | 4 | 0.5 | 13.06 |
| 10 | 19.74 | 19.74 | 8 | 6 | 4 | 0.5 | 16.27 |
| 11 | 17.78 | 21.70 | 8 | 6 | 4 | 0.5 | 18.06 |
| 12 | 11.84 | 27.64 | 8 | 6 | 4 | 0.5 | 22.67 |
| 13 | 0 | 39.48 | 8 | 6 | 4 | 0.5 | 32.66 |

[23]Aliphatic polyisocyanate (HDI trimer), commercially available from Convestro.
[24]Aliphatic polyisocyanate (HDI uretdione), commercially available from Convestro.
[25]Solvent, commercially available from Shell Chemical Company.
[26]Amount of free polyisocyanate having a weight average molecular weight of less than 600 g/mol, based on total amount of polyisocyanate. The weight average molecular weight was determined by gel permeation chromatography relative to linear polystyrene standards of 800 to 900,000 Da using a Waters 2695 separation module with a Waters 2414 differential refractometer (RI detector). Tetrahydrofuran (THF) was used as the eluent at a flow rate of 1 ml min−1, and two PLgel Mixed-C (300 × 7.5 mm) columns were used for separation at room temperature.

The components in each example in Table 5 were added slowly in a stirring/mixing vessel until a homogeneous solution was made at 20° C. The isocyanate mixture of each sample was analyzed by the described gel permeation chromatography technique.

Examples 14-25

Preparation of Multi-Layer Coatings

Several multi-layer coatings were prepared from the components listed in Table 6.

TABLE 6

| | Composition of First Basecoat | | | | Composition of Clear topcoat | | |
|---|---|---|---|---|---|---|---|
| Ex. | Component 1 | Component 2 | Mass ratio Comp. 1:2 | Composition of second basecoat | Part A | Part B | Weight % of free NCO with Mw of less than 600 g/mol[29] |
| 14* | Example 1 | T581[27] | 5:1 | Example 4 | Polyol[28] | Ex. 5 | 0.17 |
| 15* | Example 1 | T581[27] | 5:1 | Example 4 | Polyol[28] | Ex. 6 | 1.48 |
| 16* | Example 1 | T581[27] | 5:1 | Example 4 | Polyol[28] | Ex. 7 | 2.71 |
| 17* | Example 1 | T581[27] | 5:1 | Example 4 | Polyol[28] | Ex. 8 | 3.92 |
| 18 | Example 1 | T581[27] | 5:1 | Example 4 | Polyol[28] | Ex. 9 | 5.17 |
| 19 | Example 1 | T581[27] | 5:1 | Example 4 | Polyol[28] | Ex. 10 | 6.44 |
| 20 | Example 1 | T581[27] | 5:1 | Example 4 | Polyol[28] | Ex. 11 | 7.15 |
| 21 | Example 1 | T581[27] | 5:1 | Example 4 | Polyol[28] | Ex. 12 | 8.98 |
| 22 | Example 1 | T581[27] | 5:1 | Example 4 | Polyol[28] | Ex. 13 | 12.93 |
| 23 | Example 1 | T581[27] | 6.7:1 | Example 4 | Polyol[28] | Ex. 11 | 7.15 |
| 24 | Example 2 | T581[27] | 6.7:1 | Example 4 | Polyol[28] | Ex. 11 | 7.15 |
| 25 | Example 3 | T581[27] | 5:1 | Example 4 | Polyol[28] | Ex. 11 | 7.15 |

[27]T581 is a free polyisocyantate based component, commercially available at PPG Industries.
[28] Polyol based on 2K CERAMICLEAR ®, commercially available at PPG Industries, Inc.
[29]Amount of free polyisocyanate having a weight average molecular weight of less than 600 g/mol, based on total resin solids of the coating composition. The weight average molecular weight was determined by gel permeation chromatography relative to linear polystyrene standards of 800 to 900,000 Da using a Waters 2695 separation module with a Waters 2414 differential refractometer (RI detector). Tetrahydrofuran (THF) was used as the eluent at a flow rate of 1 ml min−1, and two PLgel Mixed-C (300 × 7.5 mm) columns were used for separation at room temperature.
*Represents a Comparative Example.

Each multi-layer coating was prepared by spraying their respective first and second basecoat compositions over 4 inch by 12 inch steel panels that were pre-coated with an ED 6465 electrocoat (an electrocoat commercially available from PPG). The basecoat compositions were applied under controlled environmental conditions of 70-75° F. and 60-65% relative humidity. Further, the first basecoat was made by mixing Component 1 and Component 2 right before spray, and was applied in one coat, then flashed at ambient temperature for five minutes. The film thickness of the first basecoat was 18-20 microns.

Next, the second basecoat compositions of each multi-layer coating were applied in two coats, with a 90 second ambient flash between coats, and then flashed at ambient temperature for 4 minutes and dehydrated for 7 minutes at 70° C. The film thickness of the second basecoats were 14-16 microns.

After forming the basecoat layers, the clear topcoat was made by mixing Part A and Part B, and then applied over the basecoated panels in two coats with a 90 seconds ambient flash between coats. The mixing ratio of Part A to Part B was 2:1 by weight. The coated panels were allowed to flash for 10 minutes at ambient conditions and baked for 30 minutes at 80° C. The dry film thickness of the clear topcoats were 50-55 microns. The basecoats and clear topcoat were sprayed using Binks Model 95 spray gun with an automatization air pressure at 60 psi.

Example 26

Evaluation of Multi-Layer Coatings

The distinctness of image (DOI) of the final films were measured with BYK Wavescan instrument (manufactured by BYK Gardner USA of Columbia, Maryland). The humidity resistance of the final baked films was checked by putting the final baked panels in the 63° C. water bath for 2 days. DOI was measured before the humidity test and after being taken out of the water bath and recovered at room temperature for 24 hours. DOI loss % is defined as (DOI at 24 hours recovery−DOI before humidity)/DOI before humidity. The lower value of DOI loss %, the better humidity resistance of the multi-layer coating.

Motor Vehicle Safety Standard (MVSS) was also used to check the humidity resistance and adhesion to the electrocoat layer. The procedure of MVSS testing was as follows: the final baked panels were left at room temperature for 2 days, and then ¼ (height) inch*½ (width) inch adhesive (DOW Betaseal 15955N) bead was applied on the final baked films. After 3 days at room temperature, the panels with adhesive bead were put in the Chrysler humidity box (100 F, 100% humidity) for 7 days. After 7 days, the panels were taken out and recovered at room temperature for 1 hour. After 1 hour recovery, the adhesive bead was cut around 2 mm above the film while being pulled away from the film. MVSS testing results were rated from 0-100 with 100 meaning that the film stayed intact, while 0 meaning the film was peeled off and the failure mode could be within either layer or layer interface.

The results of the DOI and MVSS testing are shown in Table 7.

TABLE 7

| Multi-layer coating Example | DOI loss % at 24 hours after recovering from humidity test | MVSS |
|---|---|---|
| Comparative Example 14 | 33 | — |
| Comparative Example 15 | 32 | — |

TABLE 7-continued

| Multi-layer coating Example | DOI loss % at 24 hours after recovering from humidity test | MVSS |
| --- | --- | --- |
| Comparative Example 16 | 21 | — |
| Comparative Example 17 | 25 | — |
| Example 18 | 19 | — |
| Example 19 | 11 | — |
| Example 20 | 6 | 85 |
| Example 21 | 4 | — |
| Example 22 | 2 | — |
| Example 23 | 18 | 90 |
| Example 24 | 24 | 10 |
| Example 25 | 10 | 5 |

As shown in Table 7, the DOI loss % is correlated with weight % of isocyanate having a weight average molecular weight less than 600 g/mol based on total resin solids in the coating composition that forms the topcoat. The increasing level of low molecular weight isocyanate shows better DOI retention after humidity.

As further shown in Table 7, the coating of Example 23 exhibited better properties than the coating of Example 24 and was prepared with a larger amount of the acrylic latex. As such, the higher levels of acrylic latex provided better properties and, in particular, better MVSS properties.

Further, Example 20 utilized an acrylic latex having a polymeric shell formed with hydroxyethyl acrylate and which has a Van Krevelen solubility parameter at 298K of 26.6 MPa$^{0.5}$ when used to form a separate homopolymer, while Example 25 utilized an acrylic latex having a polymeric shell formed with hydroxyethyl methacrylate and which has a Van Krevelen solubility parameter at 298K of 25.0 MPa$^{0.5}$ when used to form a separate homopolymer. As shown in Table 7, the coating of Example 20 exhibited significantly better MVSS properties than the coating of Example 25.

The present invention is also directed to the following clauses.

Clause 1: A multi-layer coating system comprising: a first basecoat layer formed from a first coating composition comprising a free polyisocyanate and hydroxyl functional polymeric core-shell particles, wherein a polymeric core and a polymeric shell of the hydroxyl functional core-shell particles each independently comprise an addition polymer derived from ethylenically unsaturated monomers; a second basecoat layer positioned over at least a portion of the first basecoat layer, the second basecoat layer formed from a second coating composition comprising carboxylic acid functional polymeric core-shell particles, wherein a polymeric core of the carboxylic acid functional core-shell particles comprises an addition polymer derived from ethylenically unsaturated monomers and a polymeric shell of the carboxylic acid functional core-shell particles comprises urethane linkages and carboxylic acid functional groups; and a topcoat layer positioned over at least a portion of the second basecoat layer, the topcoat layer formed from a coating composition comprising at least one free polyisocyanate having a weight average molecular weight of less than 600 g/mol and at least one film-forming resin reactive with the free polyisocyanate, wherein an amount of free polyisocyanate having a weight average molecular weight of less than 600 g/mol is greater than 5 weight %, based on the total resin solids of the coating composition that forms the topcoat layer.

Clause 2: The multi-layer coating system of clause 1, wherein the polymeric shell of the hydroxyl functional polymeric core-shell particles of the first coating composition comprises from 5 to 30 weight % of the core-shell particles, based on the total solids weight of the core-shell particles.

Clause 3: The multi-layer coating system of clauses 1 or 2, wherein the hydroxyl functional polymeric core-shell particles of the first coating composition are obtained from components that comprise greater than 10 weight % of a hydroxyl functional ethylenically unsaturated monomer, based on the total weight of the components that form the polymeric shell.

Clause 4: The multi-layer coating system of clause 3, wherein a homopolymer formed from the hydroxyl functional ethylenically unsaturated monomer has a Van Krevelen solubility parameter at 298K of greater than 25.0 MPa$^{0.5}$.

Clause 5: The multi-layer coating system of any one of clauses 1-4, wherein the first coating composition further comprises carboxylic acid functional polymeric core-shell particles, wherein a polymeric core of the carboxylic acid functional polymeric core-shell particles comprises an addition polymer derived from ethylenically unsaturated monomers and a polymeric shell of the carboxylic acid functional polymeric core-shell particles comprises urethane linkages and carboxylic acid functional groups.

Clause 6: The multi-layer coating system of any one of clauses 1-5, wherein the first coating composition and/or the second coating composition further comprises an aminoplast resin.

Clause 7: The multi-layer coating system of any one of clauses 1-6, wherein the second coating composition comprises greater than 20 weight % of the carboxylic acid functional polymeric core-shell particles, based on a total resin solids of the second coating composition.

Clause 8: The multi-layer coating system of any one of clauses 1-7, wherein the second coating composition further comprises hydroxyl functional polymeric core-shell particles, wherein a polymeric core and a polymeric shell of the hydroxyl functional polymeric core-shell particles of the second coating composition each independently comprise an addition polymer derived from ethylenically unsaturated monomers.

Clause 9: The multi-layer coating system of any one of clauses 1-8, wherein the second coating composition further comprises a free polyisocyanate.

Clause 10: The multi-layer coating system of any one of clauses 1-9, wherein the first coating composition and the second coating composition each independently comprise at least one colorant.

Clause 11: The multi-layer coating system of any one of clauses 1-10, wherein a weight ratio of the core to the shell of the hydroxyl core-shell particles of the first coating composition is from 95:5 to 70:30.

Clause 12: The multi-layer coating system of any one of clauses 1-11, further comprising a primer coating layer, wherein the first coating layer is positioned over at least a portion of the primer coating layer.

Clause 13: The multi-layer coating system of any one of clauses 1-12, wherein the free polyisocyanate in the coating composition that forms the topcoat layer comprises greater than 30 weight % of a uretdione dimer, based on the total resin solids weight of all the free polyisocyanate in the coating composition that forms the topcoat layer.

Clause 14: A substrate at least partially coated with the multi-layer coating system of any one of clauses 1-13.

Clause 15: A process of coating a substrate with a multi-layer coating comprising: forming a first basecoat layer over at least a portion of a substrate by depositing a first coating composition onto at least a portion of the substrate, wherein the first basecoat layer is formed from a first coating composition comprising a free polyisocyanate and hydroxyl functional polymeric core-shell particles, wherein a polymeric core and a polymeric shell of the hydroxyl functional core-shell particles each independently comprise an addition polymer derived from ethylenically unsaturated monomers; forming a second basecoat layer over at least a portion of the first basecoat layer by depositing a second coating composition directly onto at least a portion of (1) the first basecoat layer after the first coating composition is dehydrated or (2) the first coating composition before the first coating composition is dehydrated, wherein the second basecoat layer is formed from a second coating composition comprising carboxylic acid functional polymeric core-shell particles in which a polymeric core of the carboxylic acid functional core-shell particles comprises an addition polymer derived from ethylenically unsaturated monomers and a polymeric shell of the carboxylic acid functional core-shell particles comprises urethane linkages and carboxylic acid functional groups; and forming a topcoat layer over at least a portion of the second basecoat layer, the topcoat layer formed from a coating composition comprising at least one free polyisocyanate having a weight average molecular weight of less than 600 g/mol and at least one film-forming resin reactive with the free polyisocyanate, wherein an amount of free polyisocyanate having a weight average molecular weight of less than 600 g/mol is greater than 5 weight %, based on the total resin solids of the coating composition that forms the topcoat layer, and wherein the first basecoat composition and second basecoat composition are dehydrated at a temperature within a range of from ambient temperature to 90° C. for two minutes or less.

Clause 16: The process of clause 15, wherein the first coating composition is dehydrated before application of the second basecoat composition.

Clause 17: The process of clause 15, wherein both the first and second coating compositions are simultaneously dehydrated.

Clause 18: The process of any one of clauses 15-17, wherein, after dehydration, the first and second basecoats together comprise a solids content of at least 80 weight %, based on the total weight of the first and second basecoats.

Clause 19: The process of any one of clauses 15-18, further comprising curing the first and second coating compositions at a temperature of 120° C. or less.

Clause 20: The process of any one of clauses 15-19, further comprising curing the first and second coating compositions and the topcoat composition simultaneously at a temperature of 120° C. or less.

Clause 21: The process of any one of clauses 15-20, wherein the free polyisocyanate in the coating composition that forms the topcoat layer comprises greater than 30 weight % of a uretdione dimer, based on the total resin solids weight of all the free polyisocyanate in the coating composition that forms the topcoat layer.

Whereas particular embodiments of this invention have been described above for purposes of illustration, it will be evident to those skilled in the art that numerous variations of the details of the present invention may be made without departing from the invention as defined in the appended claims.

The invention claimed is:

1. A multi-layer coating system comprising:
a first basecoat layer formed from a first coating composition comprising a free polyisocyanate and hydroxyl functional polymeric core-shell particles, wherein a polymeric core and a polymeric shell of the hydroxyl functional core-shell particles each independently comprise an addition polymer derived from ethylenically unsaturated monomers;
a second basecoat layer positioned over at least a portion of the first basecoat layer, the second basecoat layer formed from a second coating composition comprising carboxylic acid functional polymeric core-shell particles, wherein a polymeric core of the carboxylic acid functional core-shell particles comprises an addition polymer derived from ethylenically unsaturated monomers and a polymeric shell of the carboxylic acid functional core-shell particles comprises urethane linkages and carboxylic acid functional groups; and
a topcoat layer positioned over at least a portion of the second basecoat layer, the topcoat layer formed from a coating composition comprising at least one free polyisocyanate having a weight average molecular weight of less than 600 g/mol and at least one film-forming resin reactive with the free polyisocyanate, wherein an amount of free polyisocyanate having a weight average molecular weight of less than 600 g/mol is greater than 5 weight %, based on the total resin solids of the coating composition that forms the topcoat layer; and wherein the free polyisocyanate in the coating composition that forms the topcoat layer comprises greater than 30 weight % of a uretdione dimer, based on the total resin solids weight of all the free polyisocyanate in the coating composition that forms the topcoat layer.

2. The multi-layer coating system of claim 1, wherein the polymeric shell of the hydroxyl functional polymeric core-shell particles of the first coating composition comprises from 5 to 30 weight % of the core-shell particles, based on the total solids weight of the core-shell particles.

3. The multi-layer coating system of claim 1, wherein the hydroxyl functional polymeric core-shell particles of the first coating composition are obtained from components that comprise greater than 10 weight % of a hydroxyl functional ethylenically unsaturated monomer, based on the total weight of the components that form the polymeric shell.

4. The multi-layer coating system of claim 3, wherein a homopolymer formed from the hydroxyl functional ethylenically unsaturated monomer has a Van Krevelen solubility parameter at 298K of greater than 25.0 MPa$^{0.5}$.

5. The multi-layer coating system of claim 1, wherein the first coating composition further comprises carboxylic acid functional polymeric core-shell particles, wherein a polymeric core of the carboxylic acid functional polymeric core-shell particles comprises an addition polymer derived from ethylenically unsaturated monomers and a polymeric shell of the carboxylic acid functional polymeric core-shell particles comprises urethane linkages and carboxylic acid functional groups.

6. The multi-layer coating system of claim 1, wherein the first coating composition and/or the second coating composition further comprises an aminoplast resin.

7. The multi-layer coating system of claim 1, wherein the second coating composition comprises greater than 20 weight % of the carboxylic acid functional polymeric core-shell particles, based on a total resin solids of the second coating composition.

8. The multi-layer coating system of claim 1, wherein the second coating composition further comprises hydroxyl functional polymeric core-shell particles, wherein a polymeric core and a polymeric shell of the hydroxyl functional polymeric core-shell particles of the second coating composition each independently comprise an addition polymer derived from ethylenically unsaturated monomers.

9. The multi-layer coating system of claim 1, wherein the second coating composition further comprises a free polyisocyanate.

10. The multi-layer coating system of claim 1, wherein the first coating composition and the second coating composition each independently comprise at least one colorant.

11. The multi-layer coating system of claim 1, wherein a weight ratio of the core to the shell of the hydroxyl core-shell particles of the first coating composition is from 95:5 to 70:30.

12. The multi-layer coating system of claim 1, further comprising a primer coating layer, wherein the first coating layer is positioned over at least a portion of the primer coating layer.

13. A substrate at least partially coated with the multi-layer coating system of claim 1.

14. A process of coating a substrate with a multi-layer coating comprising:
   forming a first basecoat layer over at least a portion of a substrate by depositing a first coating composition onto at least a portion of the substrate, wherein the first basecoat layer is formed from a first coating composition comprising a free polyisocyanate and hydroxyl functional polymeric core-shell particles, wherein a polymeric core and a polymeric shell of the hydroxyl functional core-shell particles each independently comprise an addition polymer derived from ethylenically unsaturated monomers;
   forming a second basecoat layer over at least a portion of the first basecoat layer by depositing a second coating composition directly onto at least a portion of (1) the first basecoat layer after the first coating composition is dehydrated or (2) the first coating composition before the first coating composition is dehydrated, wherein the second basecoat layer is formed from a second coating composition comprising carboxylic acid functional polymeric core-shell particles in which a polymeric core of the carboxylic acid functional core-shell particles comprises an addition polymer derived from ethylenically unsaturated monomers and a polymeric shell of the carboxylic acid functional core-shell particles comprises urethane linkages and carboxylic acid functional groups; and
   forming a topcoat layer over at least a portion of the second basecoat layer, the topcoat layer formed from a coating composition comprising at least one free polyisocyanate having a weight average molecular weight of less than 600 g/mol and at least one film-forming resin reactive with the free polyisocyanate, wherein an amount of free polyisocyanate having a weight average molecular weight of less than 600 g/mol is greater than 5 weight %, based on the total resin solids of the coating composition that forms the topcoat layer,
   wherein the first basecoat composition and second basecoat composition are dehydrated at a temperature within a range of from ambient temperature to 90° C. for two minutes or less; and wherein the free polyisocyanate in the coating composition that forms the topcoat layer comprises greater than 30 weight % of a uretdione dimer, based on the total resin solids weight of all the free polyisocyanate in the coating composition that forms the topcoat layer.

15. The process of claim 14, wherein the first coating composition is dehydrated before application of the second basecoat composition.

16. The process of claim 14, wherein both the first and second coating compositions are simultaneously dehydrated.

17. The process of claim 14, wherein, after dehydration, the first and second basecoats together comprise a solids content of at least 80 weight %, based on the total weight of the first and second basecoats.

18. The process of claim 14, further comprising curing the first and second coating compositions at a temperature of 120° C. or less.

19. The process of claim 14, further comprising curing the first and second coating compositions and the topcoat composition simultaneously at a temperature of 120° C. or less.

* * * * *